(12) United States Patent
Dacosta

(10) Patent No.: US 6,978,023 B2
(45) Date of Patent: Dec. 20, 2005

(54) APPARATUS AND METHOD FOR LOCATION BASED WIRELESS CLIENT AUTHENTICATION

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 144 days.

(21) Appl. No.: 10/397,934

(22) Filed: Mar. 25, 2003

(65) Prior Publication Data

US 2004/0190718 A1    Sep. 30, 2004

(51) Int. Cl.[7] .............................. H04L 9/32; H04Q 7/36
(52) U.S. Cl. ...................... 380/258; 380/270; 380/272; 455/433; 455/440; 455/456.1
(58) Field of Search ................................ 380/258, 270, 380/272; 713/168, 201; 455/421, 422, 425, 455/432, 433, 456.1, 456.6, 440

(56) References Cited

U.S. PATENT DOCUMENTS 6,011,973 A * 1/2000 Valentine et al. ......... 455/456.6
6,424,840 B1 * 7/2002 Fitch et al. ............... 455/456.1
2003/0091030 A1 * 5/2003 Yegin et al. ................ 370/352
2004/0203789 A1 * 10/2004 Hammond et al. ......... 455/440

FOREIGN PATENT DOCUMENTS

WO    WO 00/51365 A2 *  8/2000    ............ H04Q 7/00

* cited by examiner

Primary Examiner—Justin T. Darrow
(74) Attorney, Agent, or Firm—Blakely, Sokoloff, Taylor & Zafman LLP

(57) ABSTRACT

An apparatus and method for location based wireless client authentication is described. The method includes the receipt of an authentication/access request from a wireless client desiring access to a wireless network. Once the request is received, a spatial location of the client is identified. Once the physical location of the client is identified, compliance with the authentication/access request is performed according to the identified spatial location of the device. For example, in one embodiment, when the spatial location of the client falls within predefined wireless network boundaries, the client is generally granted network access. The granted access may include a possible key exchange for unidentified clients, or challenge and response authentication for identified clients. In other words, wireless clients that have gained access to a certain physical location are assumed to have passed through some other form of physical authentication and, hence, are deemed trustable.

34 Claims, 9 Drawing Sheets

APPARATUS AND METHOD FOR LOCATION BASED WIRELESS CLIENT AUTHENTICATION

FIELD

The invention relates generally to the field of wireless device security. More particularly, one or more of the embodiments of the invention relate to a method and apparatus for location based wireless client authentication.

BACKGROUND

Wireless technology provides a mechanism for either replacing or extending traditional wired networks including, but not limited to, local area networks (LANs), personal area networks (PAN) and metropolitan area networks (MAN). Using radio frequency (RF) or non-RF technology, wireless networks transmit and receive data over the air, through walls, ceilings and even cement structures without wired cabling. For example, a wireless-LAN (WLAN) is a flexible data communication system. A WLAN provides all the features and benefits of traditional LAN technology, such as Ethernet and Token Ring, but without the limitations of being tethered together by a cable. This provides greater freedom and increased flexibility.

In other words, a WLAN is a network in which a mobile user can connect to a local area network (LAN) through a wireless (radio) connection according to a wireless protocol. Wireless protocols include, but are not limited to, IEEE 802.11a, 802.11b, 802.11c, 802.11g, HiperLan 2, or any other protocol for any point-to-point wireless link or network. These wireless protocols are designed to provide high bandwidth allocation, technologies for WLANs, as well as other wireless networks. As a result, WLANs will enable, at a relatively low cost, wiring of various buildings, such as businesses, classrooms, homes or the like, while providing high bandwidth allocation.

One technique for high bandwidth allocation in either a WLAN or a wireless-PAN (WPAN) is provided via ultra wide bandwidth (UWB) radio systems. UWB radio systems are also used to provide wireless-PANS (WPAN) UWB radio systems employ the transmission of very short pulses of radio energy. These characteristic spectrum signatures extend across a wide range of radio frequencies. In addition, since UWB signals have high bandwidth and frequency diversity, UWB signals are particularly suited for high speed data communications in environments, such as indoors where multipath fading is likely. Consequently, UWB radio systems are generally well suited for implementing a WLAN.

Unfortunately, wireless networks, such as WLANs rely on a communications medium (RF waves) which represent a shared medium. As a result, everything that is transmitted or received over a wireless network can be intercepted. Generally, encryption and authentication are considered when developing a wireless network system. The goal of these security features is to make wireless traffic as secure as wired traffic. To promote this goal, wireless protocols require a mechanism for encrypting traffic and authenticating nodes such as, for example, the wired equivalence privacy (WEP) protocol.

The WEP protocol is used to protect link layer communications from eavesdropping and other attacks. Unfortunately, various individuals have discovered serious security flaws in the protocol stemming from misapplication of cryptographic primitives. As a result, a number of practical attacks have been discovered that cause the WEP protocol to fail to achieve its security goals. Therefore, there remains a need to overcome one or more of the limitations in the above-described, existing art.

SUMMARY

One embodiment of the present invention provides a method and apparatus for location based wireless client authentication. The method includes the receipt of an authentication/access request from a wireless client desiring access to a wireless network. Once the request is received, a spatial location of the client is identified. Once the spatial location of the client is identified, compliance with the authentication/access request is performed according to the identified spatial location of the client.

For example, in one embodiment, when the physical location of the client falls within predefined wireless network boundaries, the client is generally granted network access. The granted access may include a possible key exchange for unidentified clients, or challenge and response authentication for identified clients. In other words, wireless clients that have gained access to a certain location are assumed to have passed through some other form of physical authentication and, hence, are deemed trustable. Accordingly, the location based authentication described herein may be used to supplement conventional wireless client authentication, such as the wired equivalent privacy (WEP) protocol.

BRIEF DESCRIPTION OF THE DRAWINGS

The present invention is illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent, however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the present invention.

In the following description, certain terminology is used to describe features of the invention. For example, the term "logic" is representative of hardware and/or software configured to perform one or more functions. For instance, examples of "hardware" include, but are not limited or restricted to an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

A further example of software includes a "software module." A "software module" or "module" is a series of code instructions that, when executed, performs a certain function. Examples of such code include an operating system, an application, an applet, a program or even a subroutine. Software module(s) may be stored in a machine-readable medium, including, but not limited to, an electronic circuit, a semiconductor memory device, a read only memory (ROM), a flash memory, an erasable ROM (EROM), a floppy diskette, a computer disk, an optical disk, a hard disk, a fiber optic medium, a radio frequency (RF) link and the like.

System Architecture

Figure 1:
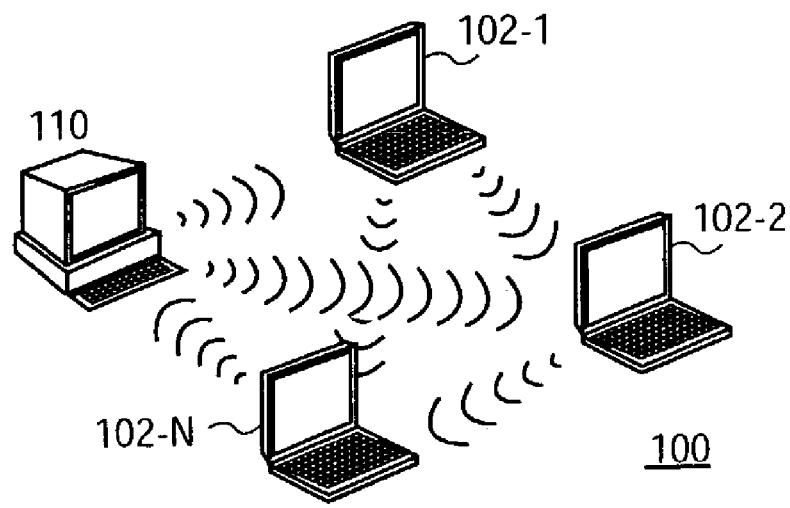
FIG. 1 is a block diagram illustrating a peer-to-peer wireless network configuration, in accordance with one embodiment of the present invention.

FIG. 1 is a block diagram illustrating a peer-to-peer configuration for a wireless network 100, in accordance with one embodiment of the invention. In embodiments depicted in FIGS. 1–3 and 5, the wireless networks may be configured according to a "wireless protocol" including, but not limited to, IEEE 802.11a, 802.11b, 802.11c, 802.11g, HiperLan 2, or any other protocol for any point-to-point wireless link or network. For example, as defined by the IEEE 802.11 standard, network 100 is configured according to an ad hoc mode as independent basic service set (IBSS). As illustrated, two or more wireless clients 102 (102-1, . . . , 102-N) equipped with, for example, wireless adapter cards to communicate with, form the wireless network 100.

As described herein, the term "wireless client" or "client" is used to refer to wireless devices including, but not limited to, personal computers including laptop computers, equipped with wireless adapter cards, as well as personal digital assistants (PDAs), appliances, and the like devices configured to communicate via a wireless communications medium such as, for example, radio frequency (RF) waves. Furthermore, as described herein, the term "wireless station" or "station" is used to refer to devices including, but not limited to, wireless base stations, wireless access points (AP), computers such as server computers, personal computers, laptops, PDAs, or like devices configured to restrict access to stored information contained therein or to an attached wired network.

For example, as defined by the IEEE 802.11 standard, network 100 is configured according to an ad hoc mode as independent basic service set (IBSS). Within the ad hoc mode (peer-to-peer wireless configuration) only the wireless clients within the transmission range (within the same cell) can communicate with each other. Generally, the peer-to-peer network configuration 100 is principally used to quickly and easily setup a wireless network where no infrastructure is available, such as a convention center or offsite meeting location.

However, in contrast to conventional wireless networks, station 110 of wireless network 100 is configured to perform location based authentication of wireless clients requesting network access. As described herein, the term "request for network access" includes, but is not limited to network access requests, authentication requests or any other like requests for access to a wireless network or WLAN. Accordingly, as described in further detail below, peer-to-peer configuration network 100 is designed to limit access to wireless devices which fall within predefined network boundaries, as described in further detail below.

Figure 2:
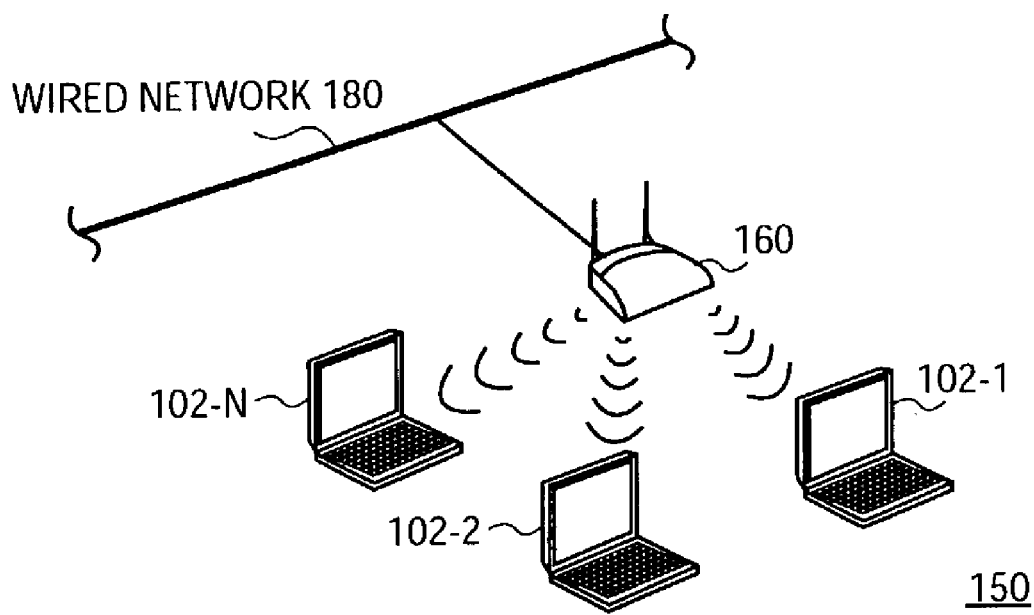
FIG. 2 is a block diagram illustrating a wireless local area network (WLAN) configuration, in accordance with one embodiment of the present invention.

FIG. 2 illustrates a WLAN network configuration 150, in accordance with one embodiment of the present invention. For example, according to the IEEE 802.11 standard, the network 150 is also referred to as infrastructure mode or basic service set (BSS). As illustrated, in the infrastructure mode, each client 102 sends all communications to a wireless local area network (WLAN) access point (station) 160. As such, the clients 102 communicate with station 160, which acts as a bridge to resources of a wired network 180. Wired network 110 may implement an Ethernet protocol, Home Plug protocol, or the like. Conventional WLAN networks may be governed by the wire equivalency protocol (WEP). However, WLAN network 150 utilizes location based authentication as described in further detail below.

Conventionally, prior to communicating data, wireless clients and station 160 establish a relationship or an association. After an association is established, wireless clients and stations exchange data. In the infrastructure mode, the clients associate with an access point (station). The association process is a two step process involving three states: (1) unauthenticated and associated; (2) authenticated and unassociated; and (3) authenticated and associated. To transition between the states, the communicating parties exchange messages called management frames. In operation, all stations transmit a beacon management frame at a fixed interval.

To associate with a station and join a wireless network, a wireless client listens for beacon messages to identify stations within range. After identifying a station, the client and the station may perform a mutual authentication by exchanging several management frames as part of the process. After successful authentication, the client moves into the second state authenticated and unassociated. Moving from the second state to the third and final state, authenticated and associated involves the client sending an association request frame and the station responding with an association response frame.

Figure 3:
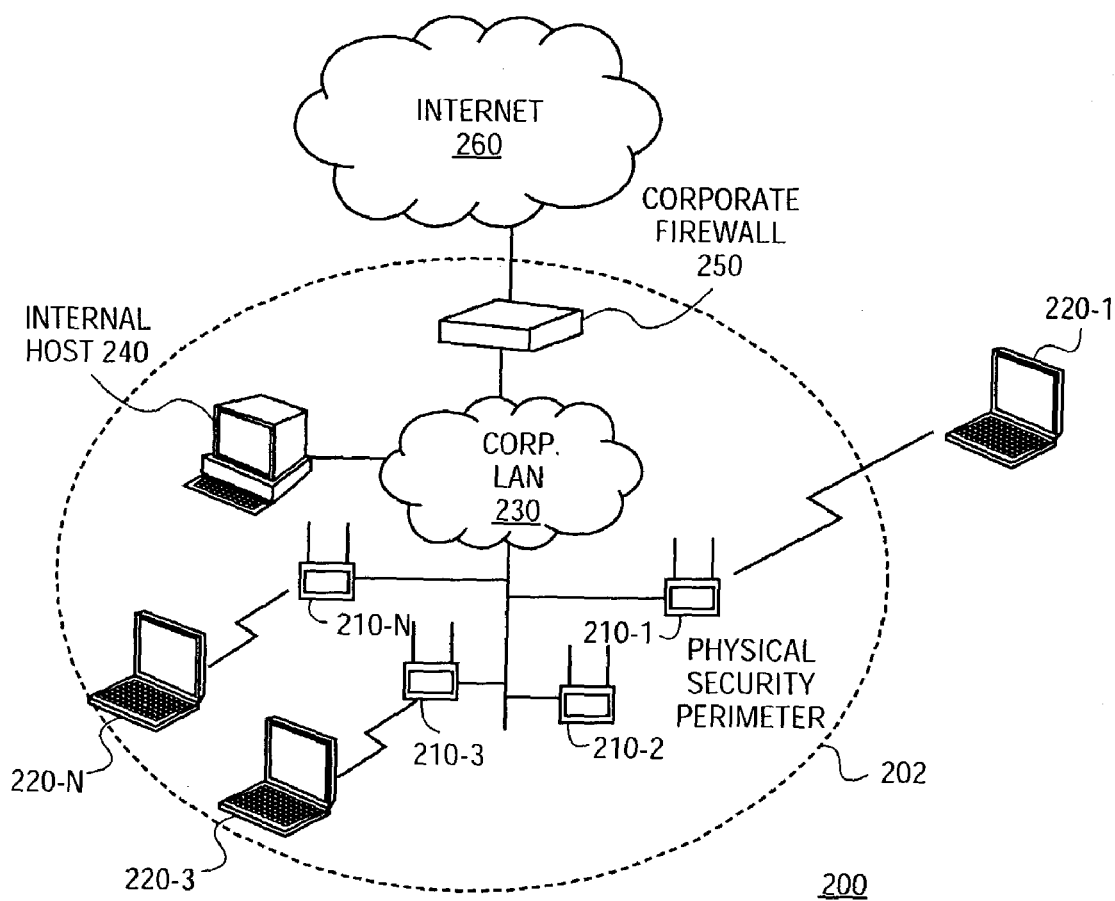
FIG. 3 is a block diagram illustrating prevention of attack on a wireless local area network using location based authentication, in accordance with one embodiment of the present invention.

Unfortunately, current techniques for providing secure wireless networks are susceptible to various attacks. For example, as illustrated in FIG. 3, WLAN 200 may come under attack from a client 220 (220-1, . . . , 220-N), which desires access to the WLAN 200 via an access point (station) 210 (210-1, . . . , 210-N). Once granted access, an attacker computer 220-1 is able to freely access corporate LAN 230, as well as internal host 240. In other words, as illustrated with reference to FIG. 3, an attacker client 220-1 is able to circumvent corporate firewall 250 which traditionally secures corporate LAN 230 from various attacks via the Internet 260.

To avoid this problem, the WEP protocol provides two mechanisms for authentication, open system authentication and shared key authentication. The open system authentication is a default authentication protocol for, for example, 802.11B. Generally, open system authentication provides access to anyone that requests authentication by providing a null authentication process. For example, as illustrated in FIG. 3, attacker client 220 may detect a beacon management frame from station 210-1. Once detected, if WLAN 200 is configured according to open system authentication, attacker client 210 may freely access corporate LAN 230, as well as internal host 240 by simply requesting access.

Shared key authentication uses a standard challenge and response scheme based on knowledge of secret keys to provide authentication. The client 220 requesting authentication (initiator) sends an authentication request management frame to station 210 indicating a desire to use shared key authentication. In response, station 210 (responder) responds by sending an authentication management frame containing 128-octets of challenge text to the initiator. The frame is generated using a WEP pseudo-random number generator (PRNG) with the "shared secret" and random initialization vector (IV).

Once the management frame is received from the initiator 220, contents of the challenge text are copied into a new management frame body, which is then encrypted using the shared secret key along with a new IV selected by the initiator 220. The encrypted frame is then sent to the responder 210. The responder decrypts the received frame and verifies the 32-bit integrity check value (ICV) as valid and that the challenge text matches that sent in the first message. When matches are detected, authentication of the initiator is successful. If authentication is successful then the initiator and the responder switch rolls and repeat the process to ensure mutual authentication.

Unfortunately, since wireless networks communicate via a shared medium, shared key authentication is easily exploited through a passive attack by the eavesdropping of one leg of a mutual authentication. The attack works because of the fixed structure of the WEP protocol. Accordingly, one embodiment of the invention describes a method and apparatus for location based authentication which may be used to supplement conventional wireless security mechanisms and ensure a secure wireless network.

As a result, in one embodiment, station 160 is configured to perform location based authentication in order to supplement, or possibly replace, shared key authentication as described above. Accordingly, as illustrated with reference to FIG. 3, WLAN 200 could be configured to prohibit granting of access/authentication requests to clients outside physical security perimeter 202. In one embodiment, configuration of stations to perform location based authentication is depicted with reference to FIG. 4.

Figure 4:
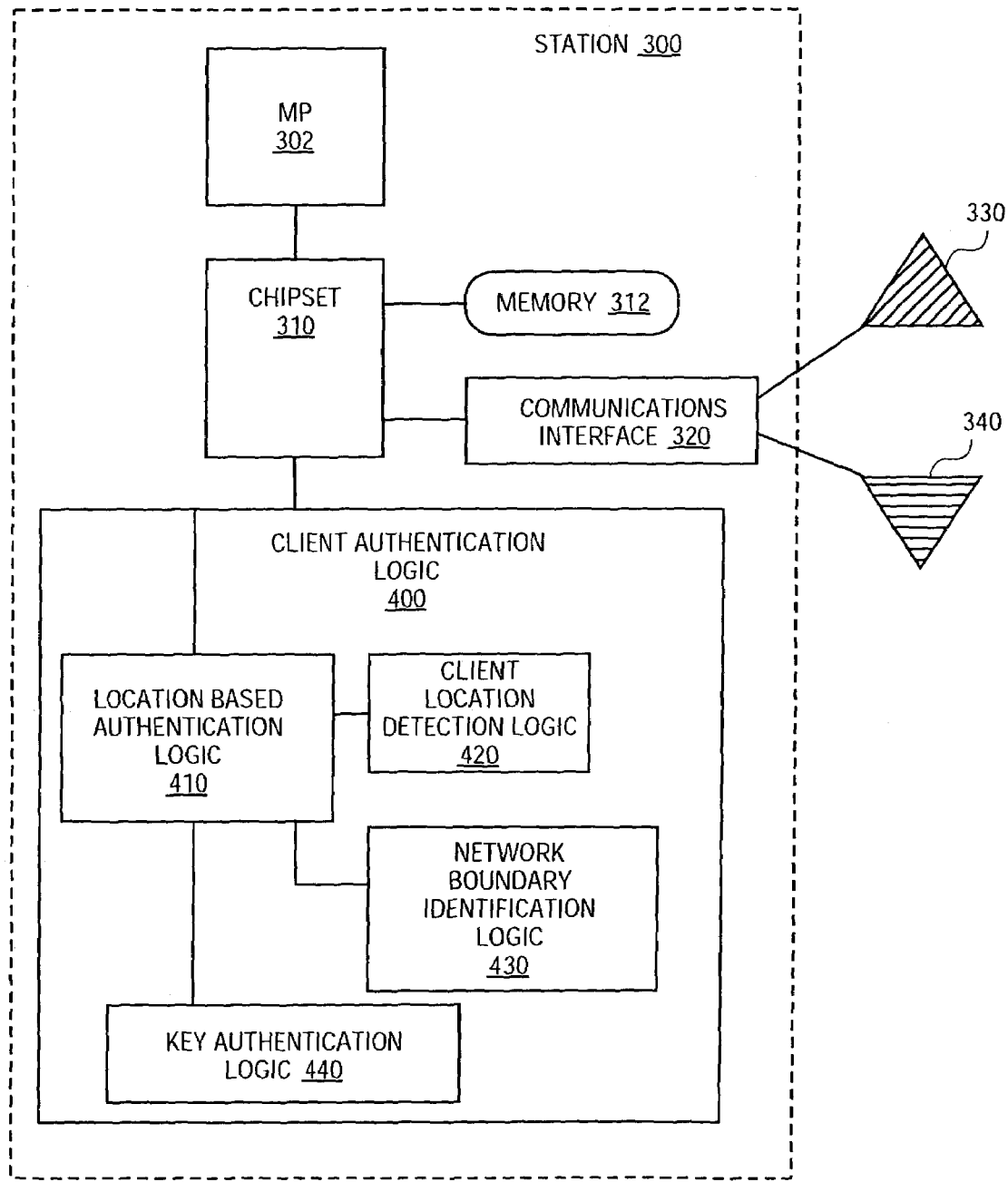
FIG. 4 is a block diagram illustrating a wireless client configured to implement location based authentication, in accordance with one embodiment of the present invention.

As illustrated in FIG. 4, a station 300 includes a microprocessor 302 which uses chipset 310 to access memory 312, as well as communications interface 320. The communications interface may include one or more incoming antennas 330, as well as one or more outgoing antennas 340. In one embodiment, station 300 may include adaptive antenna arrays and work in conjunction with additional stations to identify spatial location of wireless clients. In contrast to conventional stations, station 300 includes client authentication logic 400. The client authentication logic 400 includes location based authentication logic 410. The location based authentication logic uses network boundary identification logic 430.

In one embodiment, network boundary identification logic 430 requires inputting of one or more values to define boundaries of a network. For example, as illustrated with reference to FIG. 5, a wireless network 500 is configured within home 520. Within the embodiment, a user would be required to provide, for example, geographic coordinates identifying the boundaries of the user's home 520. In one embodiment, providing of the boundaries can simply be performed by providing a remote control device (not shown) for station 300 which a user can carry along the boundaries of their home which are recorded by the remote control.

In one embodiment, the coordinates may either be wirelessly transmitted to network boundary identification logic 430 or, for example, downloaded into identification logic 430 from the remote control once docked onto station 300. In an alternative embodiment, a geographic positioning system could be used to identify the boundaries of home 520 and provide the boundaries to identification logic 430. Based on this information, identification logic 430 generates an internal representation of the home or structure. The parameters used to form the internal representation of the wireless network may vary depending on the desired implementation which may include, for example, geographic coordinate systems, latitude and longitude readings, and the like.

In addition to the internal representation of the wireless network, in one embodiment, identification logic 430 stores data based on characteristics from a sample wireless device signal such as, for example, the estimated direction of arrival (DOA), signal strengths, and characteristics (space-time features) of multipath signals received from the wireless client. In such an embodiment, data is transmitted to the station 300 from a wireless client located at a few locations within the geographic boundaries of the wireless network and from a few locations outside the geographic boundaries of the wireless network. This information may be used to assist the client location detection logic 420 to convert detected signal characteristics from a wireless client requesting network access into network boundary identification parameters to determine whether the client is located within the wireless network boundaries.

In a further embodiment, this information can be used to perform multipath fingerprinting of wireless clients. In one embodiment, the multipath fingerprints may be stored within, for example, a database (not shown) which may be configured to adapt over time as multipath fingerprints changes over time. In a further embodiment, multiple stations may be utilized within the wireless network, which may each perform the various techniques described above for enabling analysis of the RF signal received from a wireless client and convert characteristics of the received signal into, for example, geographic coordinates, the geographic coordinates are then compared with the internal representation of the wireless network boundaries.

Accordingly, once the wireless network boundaries are provided to identification logic 430, location based authentication logic 410 functions as follows, in accordance with one embodiment. Initially, the station 300 will transmit, for example, a beacon management frame. In response, a wireless client responds to the beacon management frame with an authentication request management frame (network access request). Once received, location based authentication logic 410 uses the client location detection logic 420 to identify a spatial (relative/absolute) location of the wireless client.

In one embodiment, identifying of the wireless client's location may be performed utilizing a trusted global positioning system (GPS). In an alternative embodiment, characteristics of the radio frequency waves used to transmit the authentication request from the wireless client to the station 300 may be analyzed. For example, in one embodiment, device location detect logic 720 may generate a model of the multipath propagation effect, as well as the RF propagation effect according to the radio frequency waves used to provide the authentication request to the station 300. According to the multipath and RF propagation estimates, location detection logic 420 can determine an approximate location of the wireless client.

As will be recognized by those skilled in the art, the mechanism used to identify the location of a wireless client will depend on the model used to supplement the internal representation of the wireless network boundaries. For example, as described above, in one embodiment, multipath fingerprinting can be used to estimate the location of devices. For example, when an access request is received from a wireless client, pattern matching may be used to estimate the location of the client based on multipath characteristics of the received signal. Accordingly, in one embodiment, if the exact location of matching multipath characteristics is stored in a database, the location of the wireless client may be estimated with nearly one hundred percent accuracy.

In a further embodiment, a direction arrival, signal strength, and characteristics of spatio-temporal features of multipath signals received from the wireless client may be compared against previously stored values in order to approximate the spatial location of the wireless client. In a further embodiment, a wireless network may utilize multiple stations. When using multiple stations, in one embodiment, the location of a wireless client may be performed using triangulation. In a further embodiment, a probabilistic approach can be used to help increase the accuracy of location estimation.

For example, as described above, estimates from wireless clients located within and outside the wireless network boundaries may be analyzed using Euclidean Distance Estimation or Neural Network Estimation methods. For Euclidean Distance, the distance between the newly measured vector and stored vectors is minimized to yield the best estimation of the wireless client location. Furthermore, estimation location may be improved by determining a direct distance to a client. This may be estimated by signal strengths, as well as measuring round trip times of a packet sent from the station to the client.

For example, a packet is sent to the client after response or acknowledgement is received within a certain period of time the client is assumed to be within a certain distance of the station taking into account propagation times. Within UWB system, the round-trip time for communication of the packet can be used to provide distance estimation due to the decrease or absence of multipath fading in UWB systems.

In a further embodiment, station 300 may be equipped with direction of arrival estimation logic, such as adaptive antenna arrays. For example, in one embodiment, beam forming adaptive antenna arrays may be used to determine the direction of arrival from the signal received from the wireless client, and can also be used to estimate the distance of the wireless client. Based on this information, an approximate location of the wireless client is determined. In a further embodiment, information such as the direction of the client may be used to transmit directionally from the station 300 to the wireless clients, hence decreasing the possibility of interception from rogue clients.

As such, once either a GPS provided location or an approximate location for the wireless client is determined, the location is compared to the internal representation of the network boundaries contained within boundary identification logic 430. Consequently, when the identified spatial location of the wireless client falls within the network boundaries, location based authentication logic 410 may comply with the authentication/access request received from the wireless client. For example, in one embodiment, a wireless client authenticated based on an identified spatial location could then be provided with secret keys in order to implement future shared key authentication.

Alternatively, when the wireless client has previously communicated and successfully been granted access to the wireless network, location based authentication logic 410 uses key authentication logic 440 to engage in traditional challenge and response shared key authentication. Alternatively, the wireless client could simply be provided access once location based authentication is successful. In this embodiment, the location based authentication presupposes that the wireless client has gained access to a certain location and is assumed to have passed through some other physical authentication and, hence, is deemed trustable.

Figure 5:
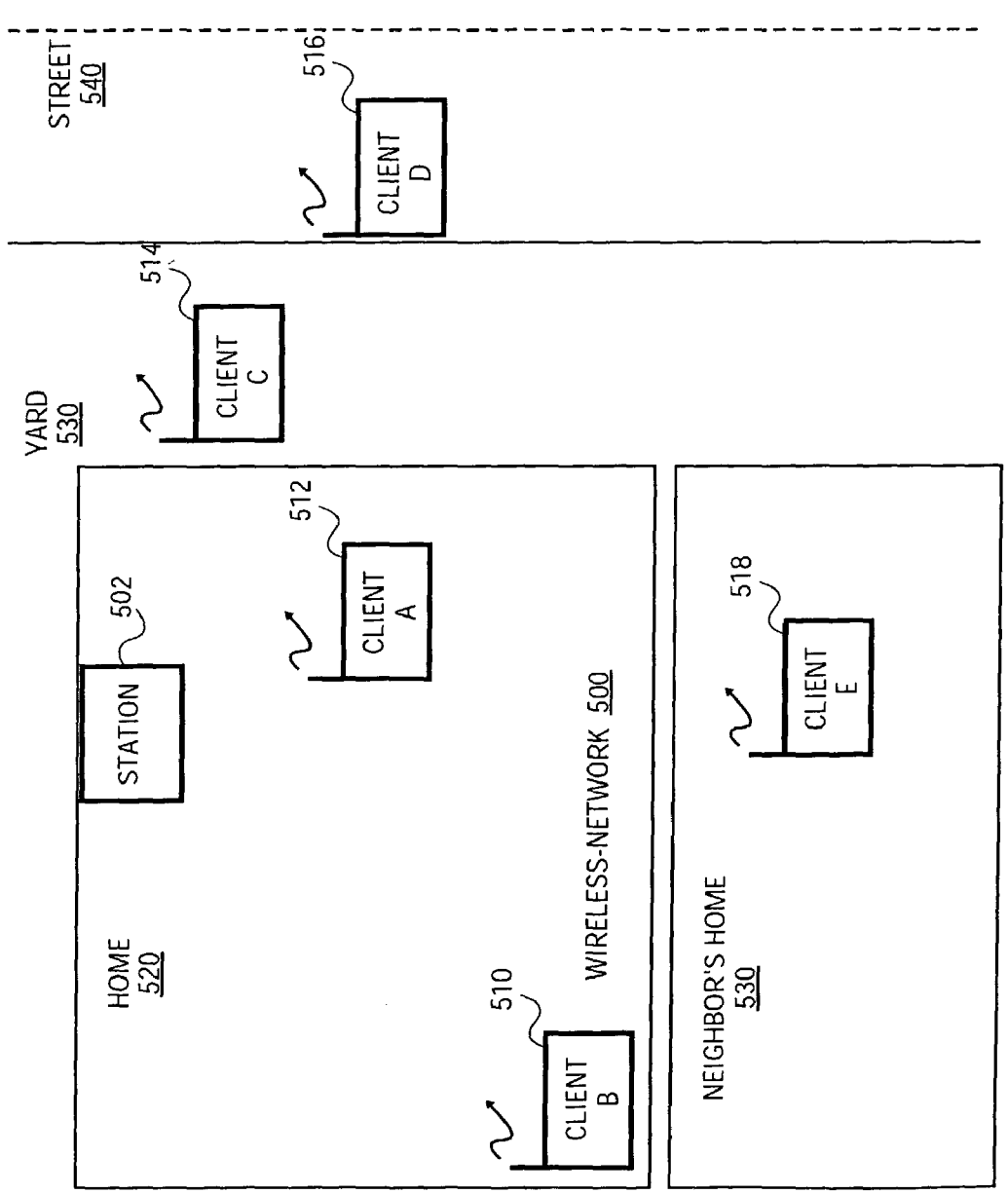
FIG. 5 is a block diagram illustrating a wireless network which uses location based authentication to supplement conventional wireless authentication, in accordance with one embodiment of the present invention.

Accordingly, as depicted with reference to FIG. 5, based on the spatial location of the various wireless clients, station 502 would grant access to wireless client 512-A and wireless client 510-B since both wireless clients reside within the network boundaries of home 520. Conversely, location based authentication would be denied to wireless client 514-C and wireless client 516-D, as well as wireless client 518-E, since each of the aforementioned wireless clients are currently located outside the network boundaries of home 520. Furthermore, the station could monitor the wireless clients and terminate communication once the wireless clients are outside the network boundaries.

Accordingly, as described in the embodiments, the spatial location of devices may be determined by the various methods described above, such as by GPS devices on the wireless devices or other methods, such as 802.11, HiperLan or UWB based positioning. In one embodiment, location based authentication is implemented in the form of hardware and software in the wireless devices. Conversely, identifying the spatial location of a wireless client may be based on characteristics of signals received from the wireless client. Accordingly, location based authentication may be based on absolute or relative location of wireless clients in accordance with embodiments of the present invention. Procedural methods for implementing embodiments of the present invention are now described.

Operation

Figure 6:
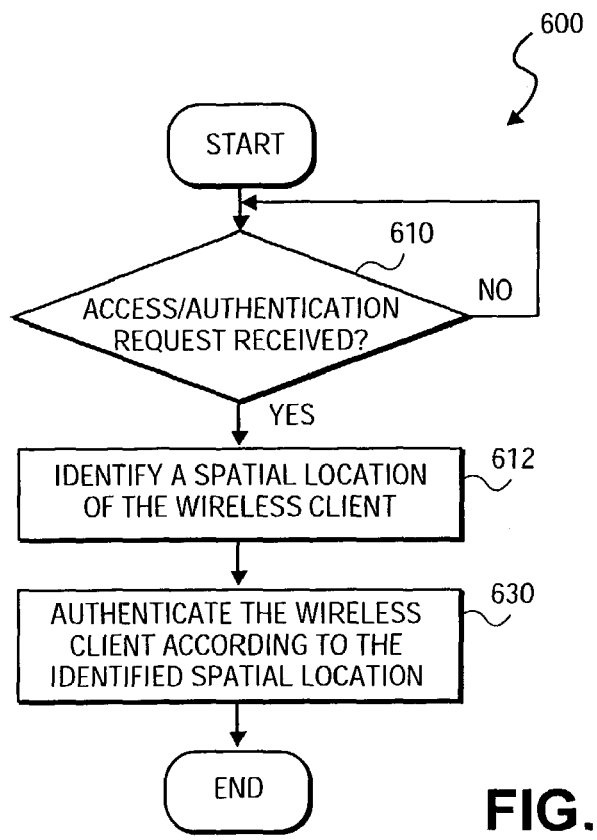
FIG. 6 is a flow chart illustrating a method for location based authentication of wireless clients, in accordance with one embodiment of the present invention.

FIG. 6 is a flow chart illustrating a method 600 for performing location based authentication of wireless clients in accordance with one embodiment of the invention. For example, the location based authentication may be performed within a network, for example, as depicted in FIG. 5, utilizing a station as described in FIG. 4, in accordance with one embodiment of the invention. At process block 610, it is determined whether or not an authentication (network access request) request is received. For example, as illustrated with reference to FIG. 5, station 502 would determine whether, for example, an authentication request is received from a wireless device (client) that is requesting access to a wireless network.

For example, as illustrated with reference to FIG. 5, the various wireless clients illustrated (A–E) are required to submit network access requests, such as, for example, authentication requests to gain access to wireless network 500. In response, at process block 630 the wireless device is authenticated according to the identified spatial location of the wireless device. In one embodiment, the location based authentication denies network access and authentication requests from wireless clients identified outside the network boundaries. In contrast, wireless clients identified as located within the network boundaries are presumed to have passed through some other method of physical authentication once they are located within predefined network boundaries. As such, devices within the network boundaries are identified as having attained a minimum level of trust.

Figure 7:
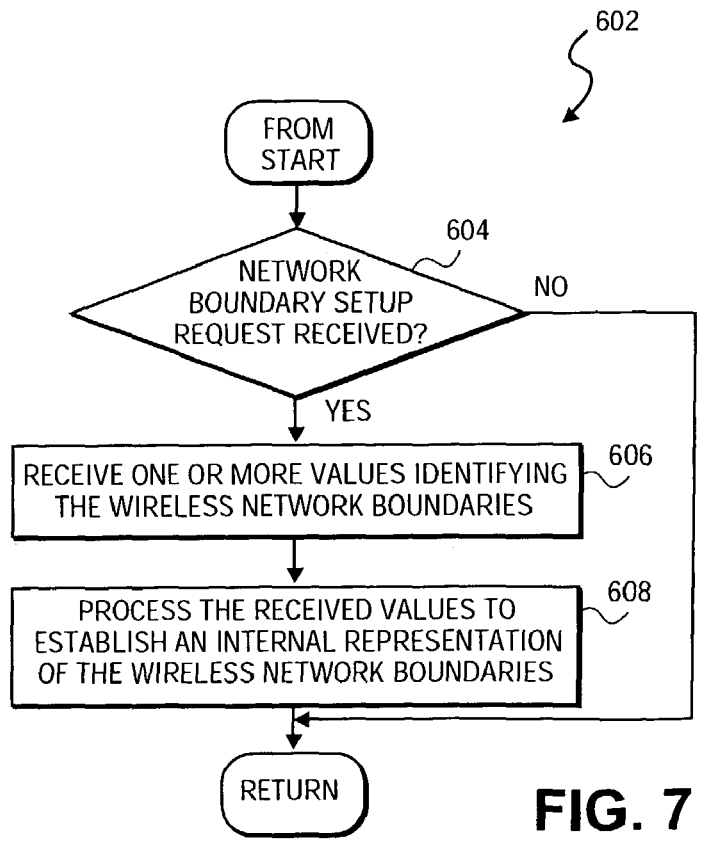
FIG. 7 is a flow chart illustrating a method for establishing an internal representation of wireless network boundaries, in accordance with one embodiment of the present invention.

FIG. 7 is a flow chart illustrating a method 602 for establishing an internal representation of wireless network boundaries, in accordance with one embodiment of the invention. At process block 604, it is determined whether a network boundary setup request is received. Once received, at process block 606 one or more values defining physical boundaries of a wireless network are received. Once the values are received, at process block 606 the received values are processed to establish an internal representation of the wireless network boundaries.

For example, in one embodiment, geographic coordinates, longitude and latitude readings, or the like are used to establish an internal representation of the network boundaries within, for example, a station 300, as depicted in FIG. 4. In one embodiment, the internal representation of the boundaries is used to compare identified spatial locations of wireless devices either relative to the network boundaries or as indicated by precise or approximate coordinate location.

Figure 8:
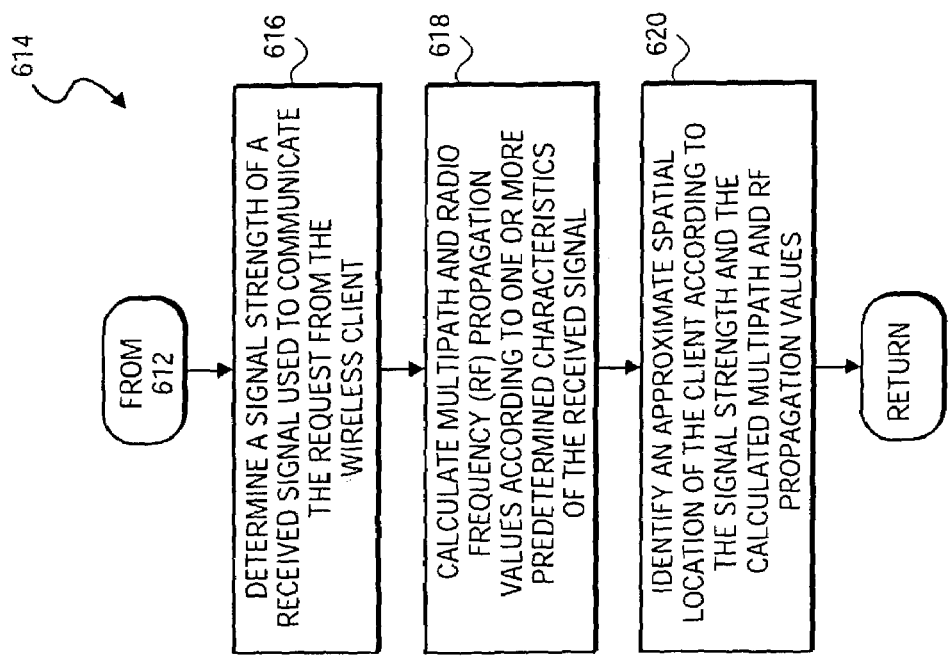
FIG. 8 is a flow chart illustrating a method for identifying the approximate spatial location of a wireless client, in accordance with one embodiment of the present invention.

Referring now to FIG. 8, a flow chart illustrating a method 614 for identifying the spatial location of a wireless device is shown, in accordance with one embodiment of the invention. At process block 616 a signal strength of a signal received from a wireless client is determined. Once the signal strength is determined, at process block 618, multipath and radio frequency (RF) propagation values are calculated according to one or more predetermined characteristics of the received signal. In one embodiment, the predetermined characteristics may include direction of arrival, spatial temporal properties, such as multipath delay in the scattering environment, and the like.

At process block 620, an approximate spatial location of the wireless client is identified according to the signal strength and the calculated multipath and radio frequency (RF) propagation values. Alternatively, multipath fingerprinting, pattern matching, direction of arrival and distance estimation, triangulation, or the like, may be used to identify the spatial location. In one embodiment, the spatial location is provided relative to the boundaries of the wireless network. In an alternate embodiment, an approximate coordinate location of the wireless client is identified. In one embodiment, an exact coordinate location of the wireless client may be provided using a geographic positioning system (GPS).

Figure 9:
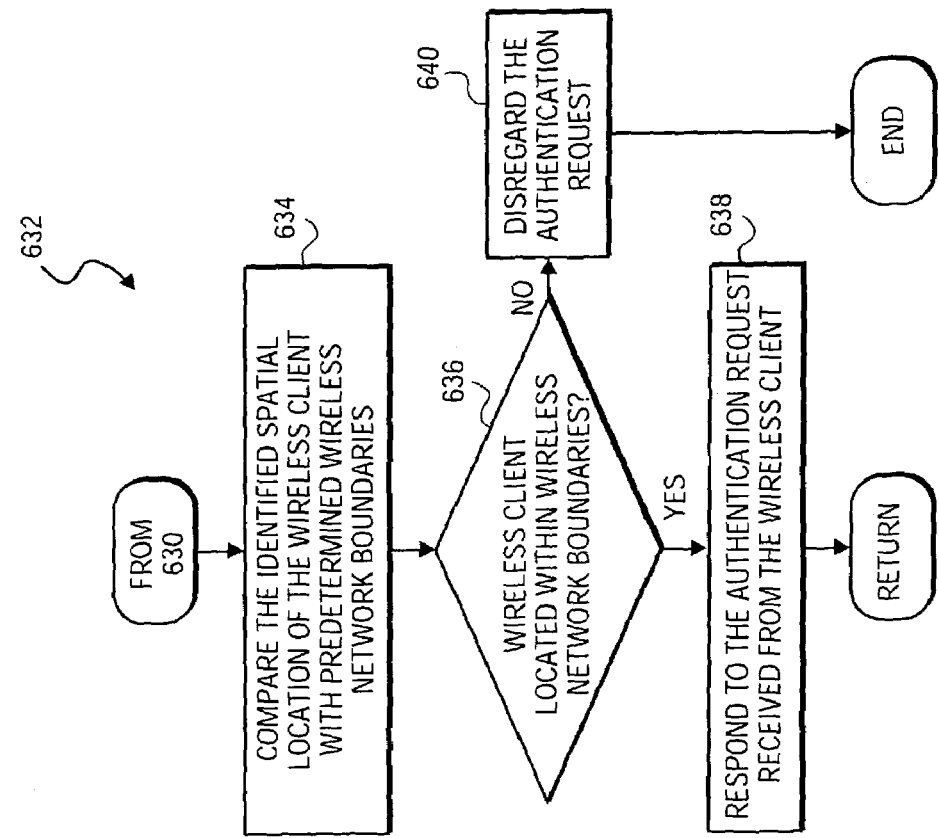
FIG. 9 is a flow chart illustrating a method for authenticating a wireless client according to its spatial location, in accordance with one embodiment of the present invention.

FIG. 9 is a flow chart illustrating a method 632 for authenticating a wireless client according to an identified spatial location of the wireless client, in accordance with one embodiment of the invention. At process block 634, the identified spatial location of the wireless client is compared with predetermined wireless network boundaries. At process block 636, it is determined whether the wireless client is physically located within the predetermined wireless network boundaries. When the wireless client is physically located within the network boundaries at process block 638, a response is provided to the network access/authentication request received from the wireless device. Otherwise, at process block 640 the network access/authentication request received from the wireless client is disregarded.

Figure 10:
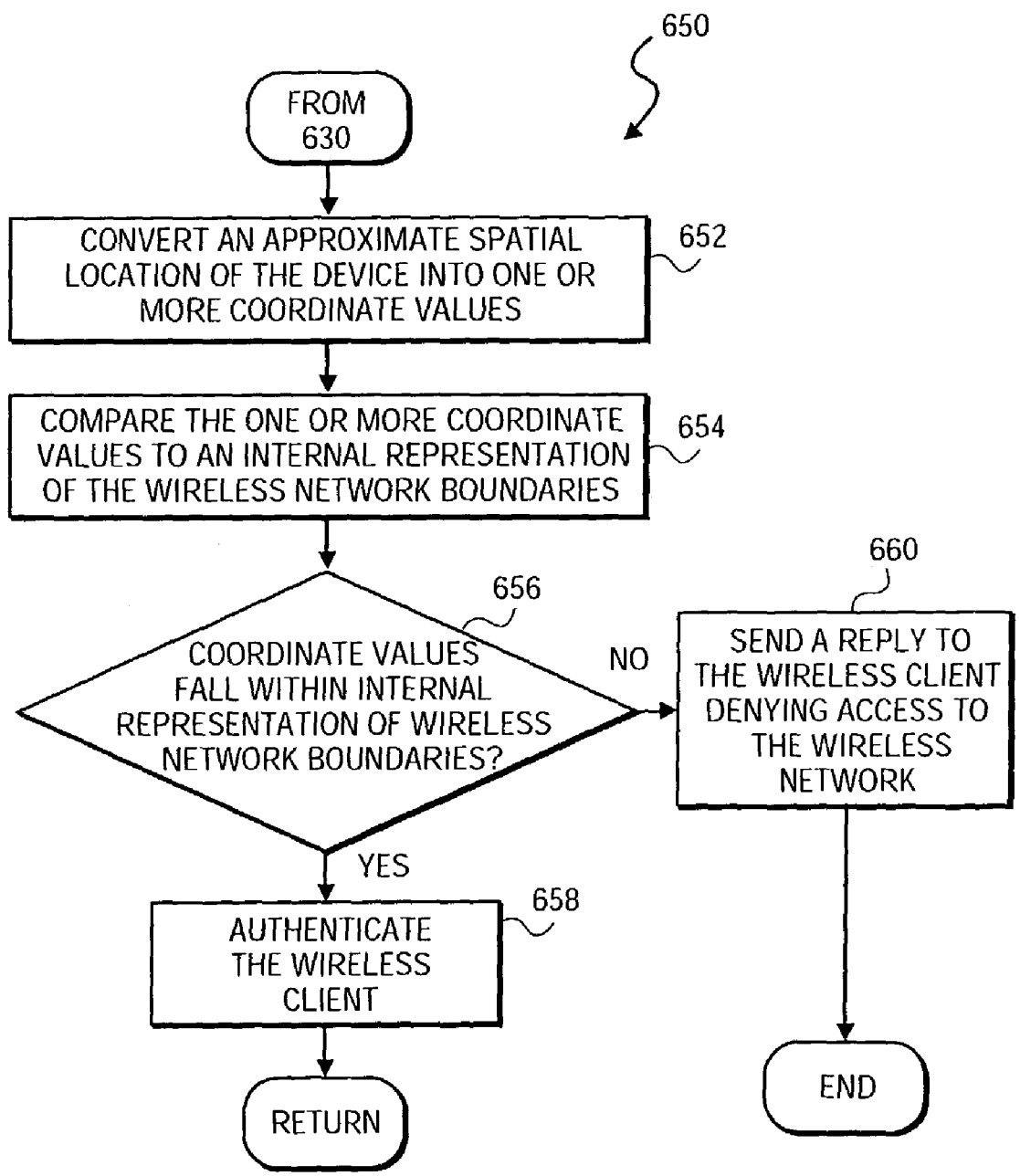
FIG. 10 is a flow chart illustrating a method for authenticating a wireless client based on its spatial location, in accordance with the further embodiment of the present invention.

FIG. 10 is a flow chart illustrating a method 650 for authenticating a wireless client according to an identified spatial location, in accordance with one embodiment of the invention. At process block 650 an approximate spatial location of the wireless device is converted into one or more coordinate values. At process block 654, the one or more coordinate values are compared to an internal representation of the wireless network boundaries. Based on the comparison, at process block 656 it is determined whether the coordinate values fall within the internal representation of the wireless network boundaries. When the values fall within coordinates of the wireless network boundaries, process block 658 is performed. Otherwise, process block 660 is performed.

At process block 658 the wireless client is authenticated based on its physical location within the wireless network boundaries. Conversely, at process block 660, a reply is sent to the wireless client denying access to the wireless network. For example, as illustrated with reference to wireless network 500 of FIG. 5, wireless clients A and B (512 and 510) are granted network access by station 502. Conversely, wireless client C (514) which is located in yard 530, wireless client D (516) which is located in street 540, and wireless client E (518) which is located within neighbor's home 530, are denied network access.

Figure 11:
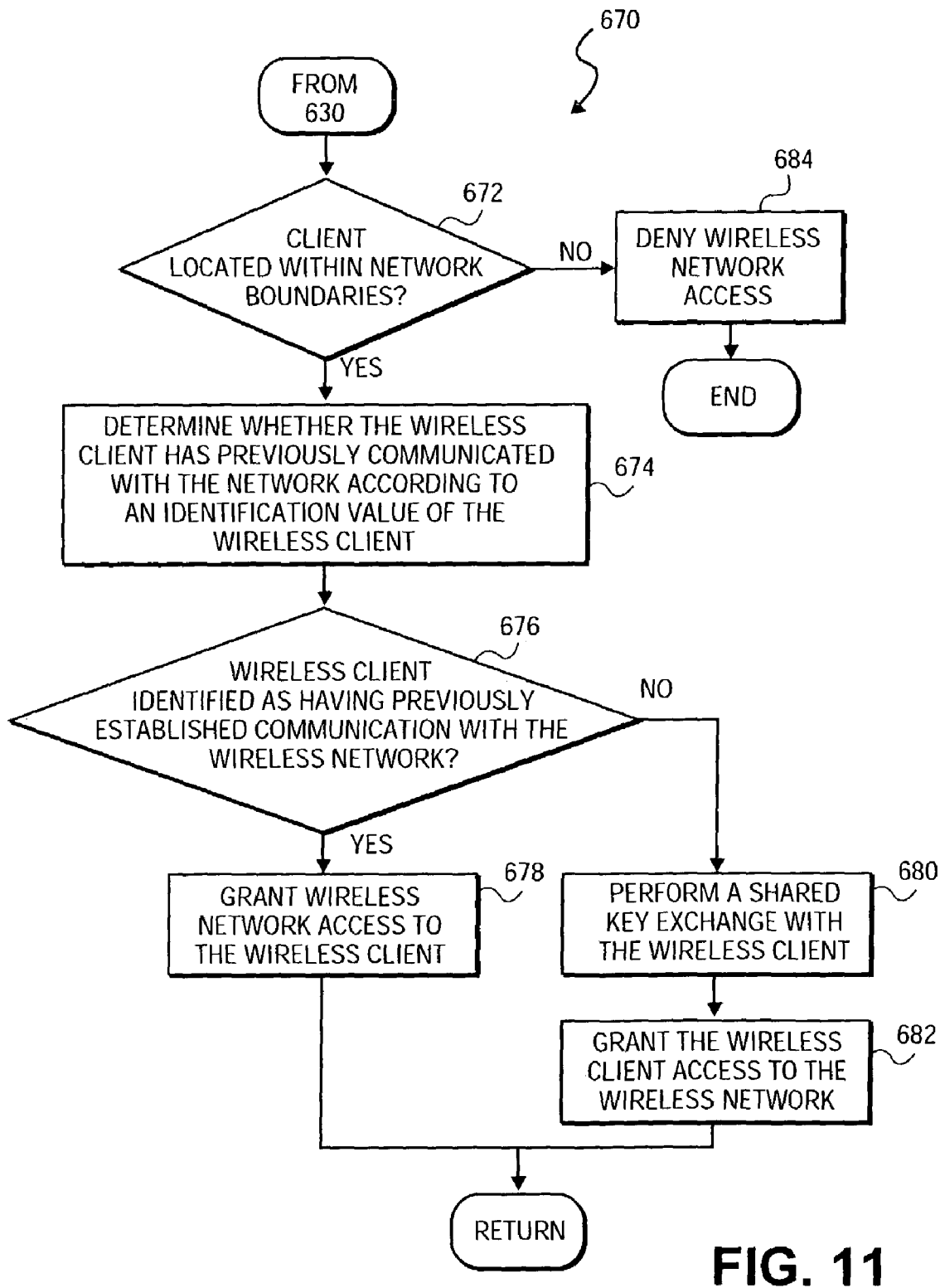
FIG. 11 is flow chart illustrating a method for performing authentication of a wireless client according to its spatial location, in accordance with one embodiment of the present invention.

FIG. 11 is a flow chart illustrating a method 670 for authenticating the wireless client according to an identified spatial location of the device, in accordance with one embodiment of the invention. At process block 672 it is determined whether the wireless client is physically located within predetermined network boundaries. When the wireless client is physically located within the network boundaries, process block 674 is performed. Otherwise, at process block 684 the wireless device is denied wireless network access. At process block 674, it is determined whether the wireless client, within the network boundaries, has previously communicated with the network according to, for example, an identification value of the wireless client.

At process block 676, when the wireless client has previously established communication with the network, process block 678 is performed. Otherwise, at process block 680 a shared key exchange is performed with the wireless client. Once the shared key exchange is performed, at process block 682 the wireless client is granted wireless network access. Otherwise, for previously identified wireless clients, at process block 678 the wireless client is granted wireless network access. In one embodiment, the challenge and response authentication scheme is engaged with the previously identified wireless clients to provide authentication of the wireless client, which may be repeated to provide mutual authentication between the wireless client and, for example, a network access point, such as depicted in FIG. 4.

Figure 12:
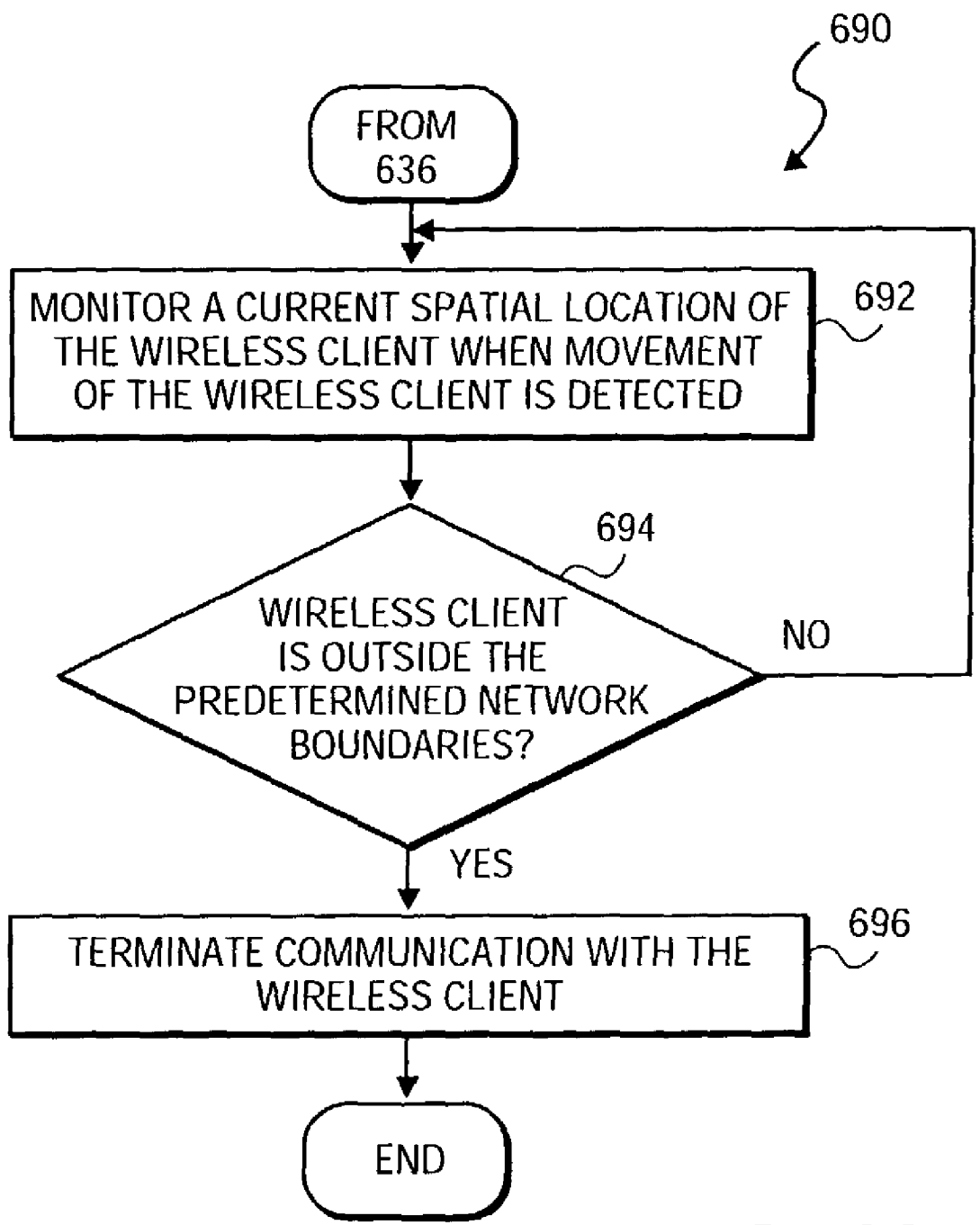
FIG. 12 is a flow chart illustrating a method for terminating communication with the wireless client once the wireless client is outside network boundaries, in accordance with one embodiment of the present invention.

FIG. 12 is a flow chart illustrating a method 690 for performing location based authentication of wireless clients, in accordance with one embodiment of the invention. At process block 692 a current spatial location of an authenticated wireless client is monitored. In other words, in one embodiment, movement of a wireless client will cause monitoring of the current spatial location of the device. At process block 694, it is determined whether the wireless client is located outside the predetermined network boundaries. When such is the case, at process block 696 termination of communication within the wireless device is performed, revoking previously granted network access. However, in one embodiment, a station, having an adaptive antenna array transmits directionally to the wireless clients to decrease the possibility of interception from rogue wireless clients.

Alternate Embodiments

Several aspects of one implementation of the location based authentication for providing improved wireless network security are described. However, various implementations of the location based authentication provide numerous features including, complementing, supplementing, and/or replacing the features described above. Features can be implemented as part of the access point or as part of the wireless devices in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   receiving, from a wireless client, a request for access to a wireless network;
   identifying, by a wireless network access point, a spatial location of the wireless client; and
   authenticating, by the wireless network access point, the wireless client, according to the identified spatial location of the wireless client.

2. The method of claim 1, wherein authenticating the wireless client further comprises:
   comparing the identified spatial location of the wireless client with predetermined wireless network boundaries;
   when the wireless client is physically located within the predetermined wireless network boundaries, responding to an authentication request received from the wireless client; and
   otherwise, disregarding the authentication request.

3. The method of claim 2, responding to the authentication request comprises:
   engaging in a challenge and response authentication with the wireless client based on commonly shared keys to authenticate the wireless client; and
   granting the wireless client access to the wireless network if the wireless client is authenticated according to the challenge and response authentication.

4. The method of claim 1, wherein the method, prior to receiving the request for access, further comprises:
   receiving one or more values identifying wireless network boundaries; and
   processing the received values to establish an internal representation of the wireless network boundaries.

5. The method of claim 1, wherein identifying the spatial location of the wireless client further comprises:
   determining a signal strength of a received signal used to communicate the authentication request from the wireless client;
   calculating multipath and radio frequency (RF) propagation values according to one or more predetermined characteristics of the received signal; and
   identifying an approximate spatial location of the wireless client according to the signal strength and the calculated multipath and RF propagation values.

6. The method of claim 1, wherein identifying the spatial location of the wireless client further comprises:
   determining coordinates of the spatial location of the wireless client using a geographic positioning system (GPS).

7. The method of claim 1, wherein authenticating the wireless client further comprises:
   converting an approximate spatial location of the wireless client into one or more coordinate values;
   comparing the one or more coordinate values to an internal representation of wireless network boundaries;
   when the one or more coordinate values falls within the internal representation of the wireless network boundaries, authenticating the wireless client; and
   otherwise, sending a reply to the wireless client denying access to the wireless network.

8. The method of claim 1, wherein authenticating the wireless client further comprises:
   determining whether the wireless client has previously communicated with the network according to an identification value of the wireless client;
   when the wireless client is identified as having previously established communication with the wireless network, granting wireless network access to the wireless client if the spatial location of the wireless client is within predetermined wireless network boundaries; and
   otherwise, performing a shared key exchange with the wireless client to enable shared key authentication during subsequent authentication requests from the wireless client, and granting the wireless client access to the wireless network, if the spatial location of the wireless client is within the predetermined wireless network boundaries.

9. The method of claim 1, wherein authenticating the wireless client further comprises:
engaging in a challenge and response authentication of the wireless client when the wireless device is physically located within predetermined wireless network boundaries.

10. The method of claim 1, further comprising:
monitoring a current spatial location of the wireless client when movement of the wireless device is detected; and
terminating communication with the wireless device once the current spatial location of the wireless device is outside predetermined network boundaries.

11. A machine readable medium including software executed by at least one processor, within an electronic device, the software comprising:
an identification module to identify a spatial location of a wireless client if a request for access to a wireless network is received from the wireless client; and
an authentication module to authenticate the wireless client, according to the identified spatial location of the wireless client, wherein the identification module determines a signal strength of a received signal used to communicate the request from the wireless client, calculates multipath and radio frequency (RF) propagation values according to one or more predetermined characteristics of the received signal, and identifies an approximate spatial location of the wireless client according to the signal strength and the calculated multipath and RE propagation values.

12. The machine readable storage medium of claim 11, wherein the authentication module responds to an authentication request received from the wireless client if the wireless client is physically located within predetermined wireless network boundaries, and otherwise, disregards the received authentication request.

13. The machine readable medium of claim 12, wherein the authentication module
engages in a challenge and response authentication with the wireless client based on commonly shared keys to authenticate the wireless client.

14. The machine readable medium of claim 11, wherein the software further comprises:
a network boundary module to process one or more received values identifying wireless network boundaries to establish an internal representation of the wireless network boundaries prior to receiving access requests.

15. The machine readable medium of claim 11, wherein the identification module determines coordinates of the spatial location of the wireless client using a geographic positioning system (GPS).

16. The machine readable storage medium of claim 11, wherein the authentication module converts an approximate spatial location of the wireless client into one or more coordinate values, compares the one or more coordinate values to an internal representation of wireless network boundaries, authenticates the wireless client if the one or more coordinate values falls within the internal representation of the wireless network boundaries, and otherwise, sends a reply to the wireless client denying access to the wireless network.

17. The machine readable storage medium of claim 11, wherein the authentication module grants wireless network access to the wireless client if the spatial location of the wireless client is within predetermined wireless network boundaries and if the wireless client is identified as not having previously established communication with the wireless network, performs a shared key exchange with the wireless device to enable shared key authentication during subsequent authentication requests from the wireless client.

18. The machine readable storage medium of claim 11, wherein the authentication module engages in a challenge and response authentication of the wireless client if the wireless client is physically located within predetermined wireless network boundaries.

19. The machine readable storage medium of claim 11, wherein software further comprises:
a motion detection module to monitor a current spatial location of the wireless client if movement of the wireless client is detected, and terminate communication with the wireless client once the current spatial location of the wireless client is outside predetermined network boundaries.

20. A base station comprising:
a communication interface to receive an authentication request being a request from a wireless client requesting network access; and
circuitry coupled to the communications interface, the circuitry comprising authentication logic to respond to the authentication request when an identified spatial location of the wireless client falls within predetermined network boundaries.

21. The apparatus of claim 20, wherein the authentication logic of the circuitry further comprises:
device location detection logic to identify a relative/spatial location of wireless clients requesting network access.

22. The apparatus of claim 20, wherein the authentication logic of the circuitry further comprises:
network boundary identification logic to generate an internal representation of the network boundaries according to received coordinate values.

23. The apparatus of claim 20, further comprising:
a remote control device to capture coordinate values of network boundaries and provide the coordinate values to boundary identification logic of the authentication logic.

24. The apparatus of claim 21, wherein the device location detection logic of the circuitry includes a geographic positioning system to identify the spatial location of wireless devices requesting network access.

25. A system comprising:
a wireless local area network (WLAN) having predetermined wireless network boundaries; and
a station located within the predetermined wireless network boundaries, the station including authentication logic circuitry to respond to an authentication request being a network access request from a wireless client when an identified spatial location of the wireless client falls within the predetermined wireless network boundaries.

26. The system of claim 25, wherein the authentication logic circuitry further comprises:
device location detection logic to identify a relative/spatial location of wireless devices requesting network access.

27. The system of claim 25, wherein the authentication logic further comprises:

network boundary identification logic to generate an internal representation of the network boundaries according to received coordinate values.

28. The system of claim 25, further comprising:
a remote control device to capture coordinate values of the network boundaries and provide the coordinate values to boundary identification logic of the authentication logic.

29. The system of claim 25, wherein the station further comprises:
a communications interface including an adaptive antenna array to enable directional communication with authenticated wireless clients to reduce communication interception by unauthenticated wireless clients.

30. A method comprising:
receiving, from a wireless client, a request for access to a wireless network;
identifying, by a wireless network access point, a spatial location of the wireless client;
authenticating, by the wireless network access point, the wireless client according to the identified spatial location of the wireless client; and
granting, by the wireless network access point, the wireless client according to the wireless client access to the wireless network if the wireless client is authenticated according to the identified spatial location of the wireless client.

31. The method of claim 30, wherein authenticating the wireless further comprises:
engaging in a challenge and response authentication with the wireless client based on commonly shared keys to authenticate the wireless client, if the identified spatial location of the wireless client indicates that the wireless client is located within predetermined wireless network boundaries.

32. The method of claim 30 wherein authenticating the wireless client further comprises:
establishing authentication of the wireless client to grant the request for access to the wireless network if the identified spatial location of the wireless client indicates that the wireless client is physically located within predetermined wireless network boundaries.

33. The method of claim 30 wherein the wireless network is a wireless local area network.

34. The system of claim 25, wherein the station comprises an access point of the WLAN.

* * * * *